May 9, 1961  E. A. CLEMETSEN ET AL  2,983,358
STEP TREAD
Filed July 27, 1959  2 Sheets-Sheet 1

INVENTORS
ERLING A. CLEMETSEN
JOHN A. CLEMETSEN
BY Thredy & Thredy
THEIR ATTORNEYS.

May 9, 1961  E. A. CLEMETSEN ET AL  2,983,358
STEP TREAD
Filed July 27, 1959  2 Sheets-Sheet 2
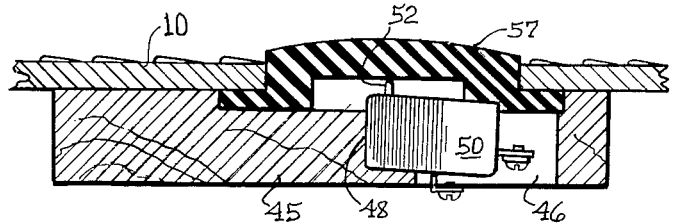
Fig. 3.
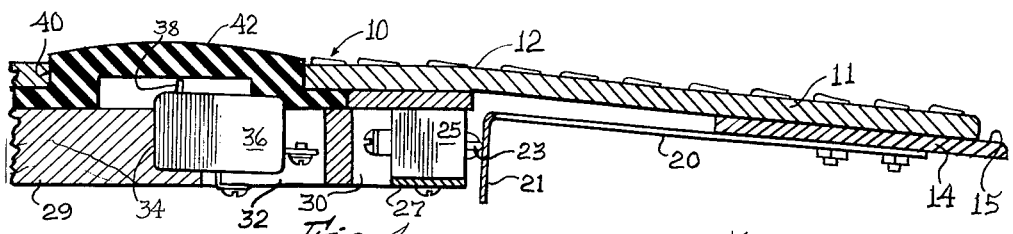
Fig. 4.
Fig. 5.
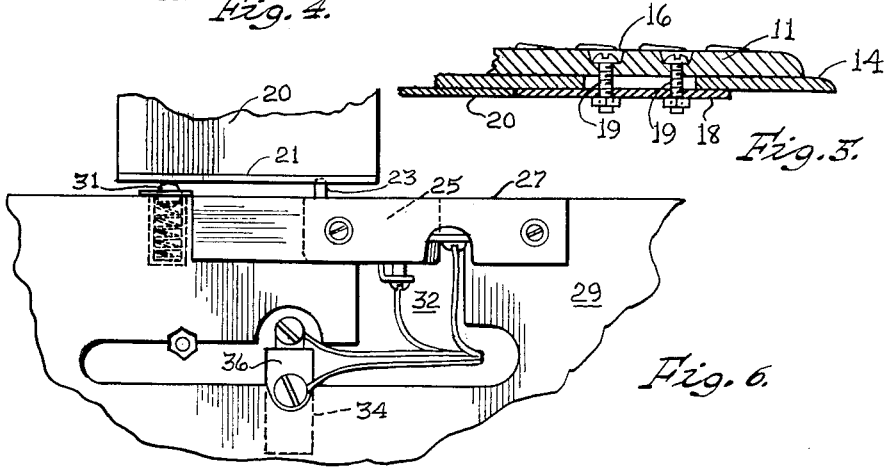
Fig. 6.
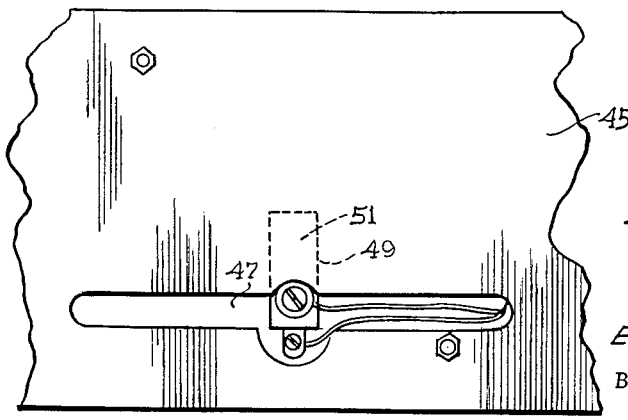
Fig. 7.
INVENTOR.
EARLING A. CLEMETSEN
JOHN A. CLEMETSEN
BY Threedy & Threedy
THEIR ATTORNEYS.

United States Patent Office 2,983,358
Patented May 9, 1961

2,983,358

STEP TREAD

Erling A. Clemetsen and John A. Clemetsen, both of 500 N. Sheridan Road, Wilmette, Ill.

Filed July 27, 1959, Ser. No. 829,610

2 Claims. (Cl. 198—16)

Our invention relates to new and useful improvements in a step tread and more particularly to a step tread associated with an escalator or the like.

A principal object of our invention is in the provision in a device of this character of a foot-operated control switch arrangement imbedded in a step tread and for controlling an electrical drive for an escalator or the like.

Another object of our invention is in the provision in a device of this character of a safety switch carried by said step tread for controlling the operation of an escalator or the like.

Yet, another object of our invention is in the provision in a device of this character of a circuit for controlling the energization and direction of a drive motor for an escalator or the like.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 3 is a fragmentary detailed sectional view taken on line 3—3 of Fig. 1;

Fig. 4 is a fragmentary detailed sectional view taken on line 4—4 of Fig. 1;

Fig. 5 is a fragmentary detailed sectional view taken on line 5—5 of Fig. 1;

Fig. 6 is an enlarged fragmentary plan view showing a section of the bottom plan view of Fig. 2;

Fig. 7 is an enlarged fragmentary plan view showing a section of the bottom plan view of Fig. 2.

Our invention relates to a step tread associated with an escalator as shown and described in our co-pending application Serial No. 829,611, now Patent No. 2,940,578, dated June 14, 1960.

It is desirous that at each landing or floor level of our escalator there be positioned a step tread as shown by the accompanying drawings and hereinafter described.

Figure 1:
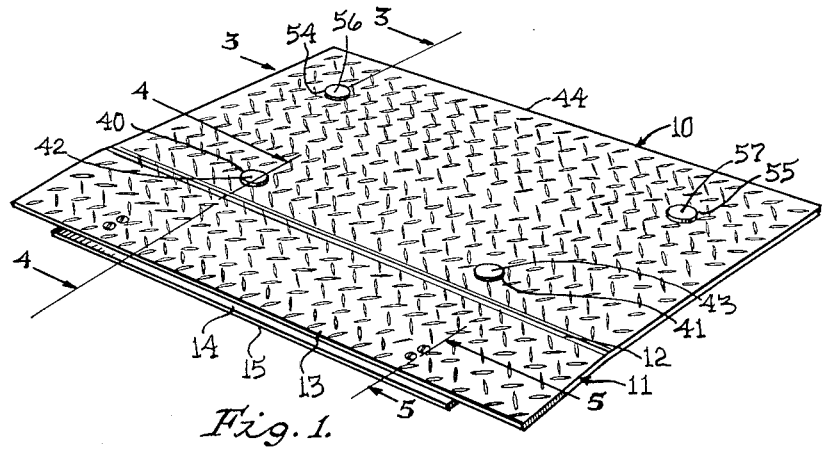
Fig. 1 is a perspective view of our step tread.
Figure 2:
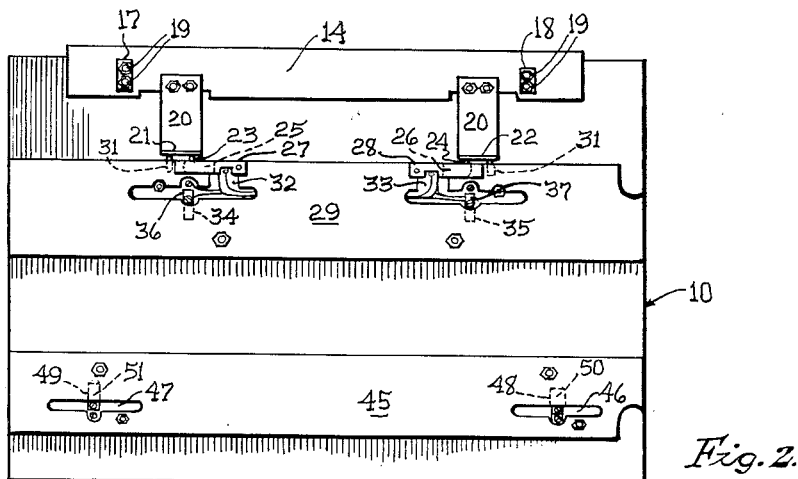
Fig. 2 is a bottom plan view of the same.

Our step tread is indicated as at 10. A portion 11 thereof is tapered along line 12 in a downward direction as seen in Figs. 1 and 4, to provide a depressed leading edge 13. Slidably connected to the bottom of the step tread 10 adjacent the leading edge 13 is an actuator plate 14. This plate 14 provides a portion 15 thereof which extends beyond the leading edge 13 of the step tread 10 as seen in Figs. 1, 2, 4 and 5.

This plate 14 has formed thereon two spaced apart parallelly extending openings one of which is readily seen at 16 in Fig. 5. Beneath each of these openings is a retaining plate 17 and 18. These retaining plates 17 and 18 are fixedly connected to the step tread 10 in spaced relation by means of a nut and bolt 19 or the like. By such an arrangement it is readily seen that the plate 14 is connected to the underside of the step tread 10 in a manner which permits limited slidable movement with respect thereto.

Extending perpendicularly to the longitudinal length of the plate 14 is a pair of switch actuators 20. These switch actuators 20 are fixedly secured to the plate 14 by welding or the like. Each of the switch actuators 20 provides a bent portion 21 and 22 which is in engagement with a plunger 23 and 24 of a pair of micro-type switches 25 and 26.

The switches 25 and 26 are in a circuit which effects a reversible motor. These switches 25 and 26 are each connected to a bracket 27 and 28 respectively which are in turn connected to a bottom member 29 carried beneath the step tread 10. The switches 25 and 26 as carried by their brackets 27 and 28 are adapted to be positioned in recesses 30 formed in the longitudinal edge of the member 29.

To maintain the actuator plate 14 in its limited extending position with respect to the leading edge 13 of the step tread 10, we employ two ball springs 31. These ball springs 31 together with the switch plungers 23 and 24 yieldably position the plate 14 in its operative position as seen in Fig. 1.

The bottom member 29 is provided with a pair of cut-out portions 32 and 33. These cut-out portions 32 and 33 communicate with the recesses 30 as seen in Figs. 4 and 6. Each of these cut-out portions 32 and 33 are provided with a slot 34 and 35 into each of which frictionally sits a portion of a switch 36 and 37.

Each of the switches 36 and 37 is provided with a plunger 38 which extends in a vertical position as seen in Fig. 4. This step tread 10 is provided with a plurality of circular openings 40 and 41 which are in vertical alignment with the cut-out portions 32 and 33. Fixedly positioned in the openings 40 and 41 are resilient elements 42 and 43. The plungers 38 and 39 of the switches 36 and 37 are normally in engagement with a portion of the elements 42 and 43 as seen in Fig. 4. It is readily apparent that when the resilient elements 42 and 43 are depressed by the weight of a person standing thereon into the openings 40 and 41 formed in the step tread 10 the plungers 38 and 39 will be caused to close the switches 36 and 37.

Adjacent the rear edge 44 the step tread 10 carried therebeneath is a second bottom member 45. This bottom member 45 is provided with cut-out portions 46 and 47 having associated therewith slots 48 and 49 respectively. Into the slots 48 and 49 in position switches 50 and 51 respectively. Each of these switches 50 and 51 has vertically extending plungers 52 and 53. The step tread 10 has formed therein openings 54 and 55 which are in communication with the cut-out portions 46 and 47. A pair of resilient elements 56 and 57 close such openings as seen in Fig. 3. The arrangement between these elements 56 and 57 and the plungers 52 and 53 and the operation thereof is similar to the heretofore described similar elements 42 and 43.

Figure 8:
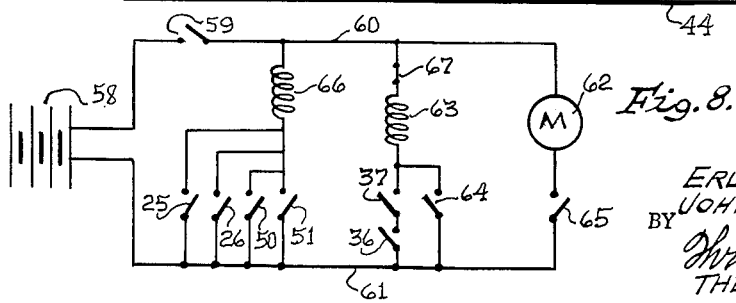
Fig. 8 is a schematic diagram of a proposed electrical circuit including certain switches as contained in the step tread.

Fig. 8 shows a schematic circuit diagram including a power source 58, a master switch 59, conductors 60 and 61, and a reversible motor 62. To energize the motor 62 it is apparent that the switches 36 and 37 must be simultaneously closed.

The closing of these switches will energize the relay coil 63 which in turn will close relay switches 64 and 65. As the master switch 59 is closed the closing of the switch 65 will energize the motor 62. The closing of the switch 64 will maintain the energization of the relay coil 63 after the switches 36 and 37 are again opened.

When the motor 62 is to be deenergized closing of either of the switches 50 or 51 will energize the relay coil 66 which in turn will open relay switch 67 which will deenergize the relay coil 63 and open the switches 64 and 65 deenergizing the motor 62.

In the event that an article is placed on the escalator or a person riding the same does not step off the escalator as it approaches a landing or floor level, the switch actuator plate 14 will engage the same and be caused to slidably move against the ball springs 31 and plungers 23 and 24 of the switches 25 and 26 closing the same and deenergizing the motor 62 in the manner hereinbefore described.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described my invention, what we claim as new and desire to protect by Letters Patent is:

1. A control device for an escalator motor having a power circuit comprising a substantially flat rectangularly-shaped member onto which a person is adapted to step, foot actuated means carried by said member and in said power circuit for effecting energization and de-energization of said motor, an actuated member carried by said first member and having a portion thereof extending outwardly from an adjacent transverse edge of said first member, means providing slidable connection between said actuating member and said first member, and switch means carried by said first member and in said circuit and adapted to be actuated by said actuating means when the latter is moved in one direction relative to said first member to effect the energization of said motor after said motor has been energized by said first energizing means.

2. A control device for an escalator motor as defined in claim 1 characterized by an outwardly and downwardly tapered edge portion of said first member from which said actuator member projects.

References Cited in the file of this patent
UNITED STATES PATENTS

| | | |
|---|---|---|
| 1,438,112 | Hendricks | Dec. 5, 1922 |
| 2,147,979 | Kearney | Feb. 21, 1939 |